F. MÜLLER.
MILLING CUTTER.
APPLICATION FILED DEC. 23, 1911. RENEWED MAR. 19, 1915.
1,194,865.
Patented Aug. 15, 1916.
2 SHEETS—SHEET 1.
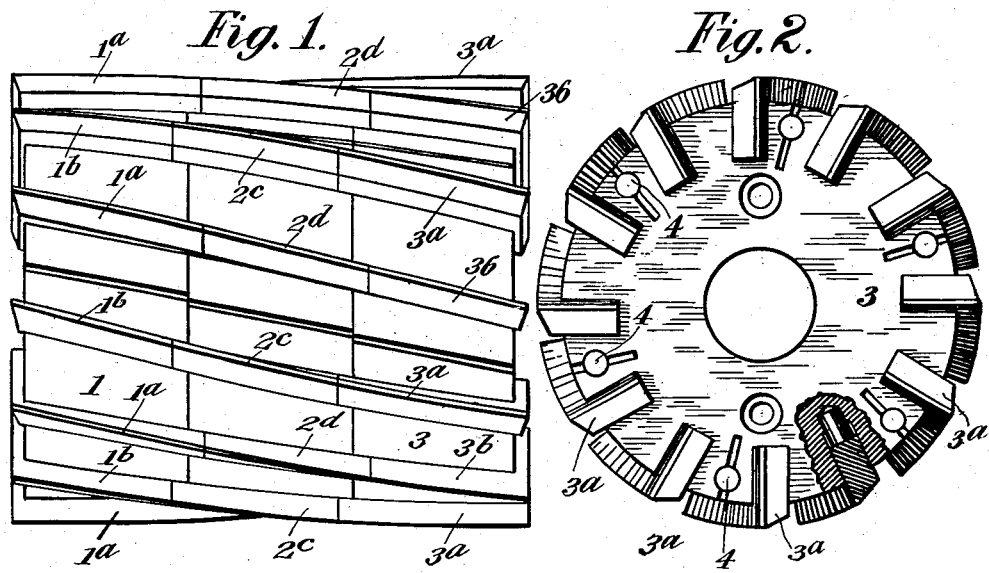
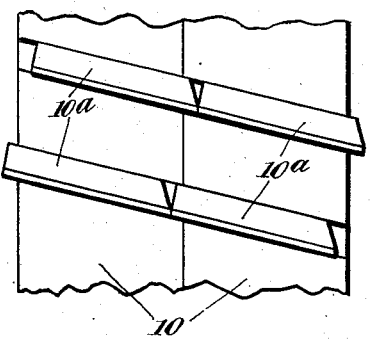
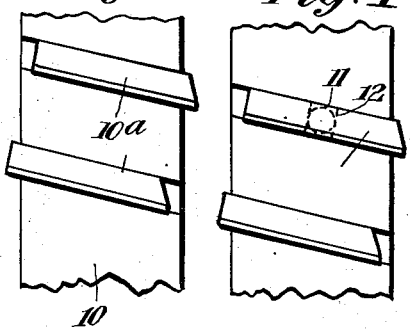
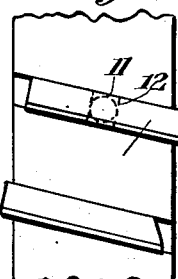
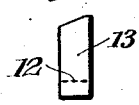
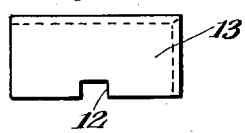
Witnesses:
F. H. Elliott
R. R. Murphy
Inventor.
Friederich Müller
by Jos. H. Freeman
Atty

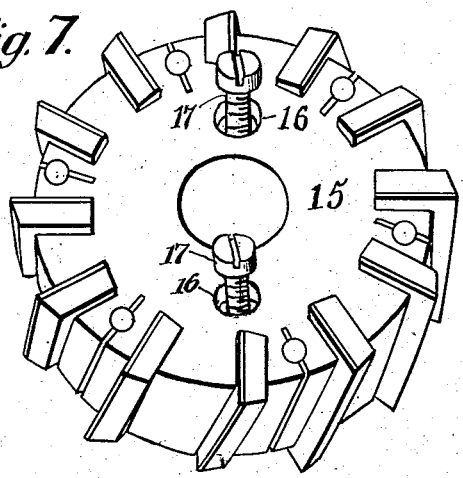
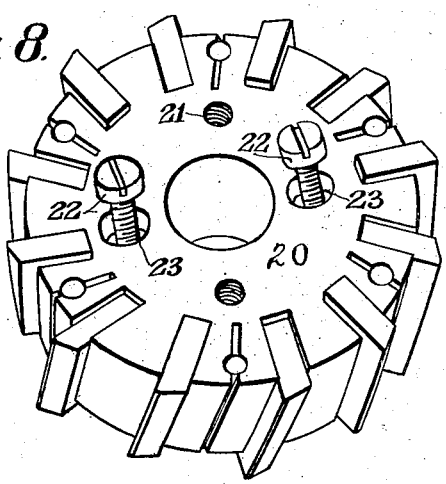
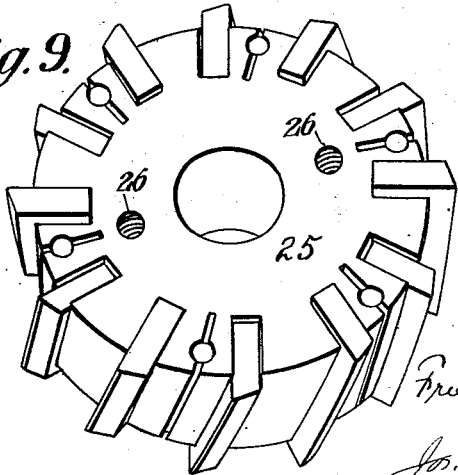

UNITED STATES PATENT OFFICE.

FRIEDERICH MÜLLER, OF HARTFORD, CONNECTICUT, ASSIGNOR TO PRATT & WHITNEY COMPANY, OF HARTFORD, CONNECTICUT, A CORPORATION OF NEW JERSEY.

MILLING-CUTTER.

1,194,865.  Specification of Letters Patent.  Patented Aug. 15, 1916.

Application filed December 23, 1911, Serial No. 667,518. Renewed March 19, 1915. Serial No. 15,578.

*To all whom it may concern:*

Be it known that I, FRIEDERICH MÜLLER, a citizen of the United States, and a resident of Hartford, county of Hartford, State of Connecticut, have invented certain new and useful Improvements in Milling-Cutters, of which the following is a specification.

This invention relates to a milling cutter having inserted teeth or blades, and has for an object to provide such a cutter with blades of true helical form such that the cutting edges throughout their length will bear a constant angular relation to the axis of the cutter and such that the blades may be accurately ground without detaching them from the holder or body portion of the cutter; also to provide a cutter having a plurality of body sections, the blades of which are associated to form substantially continuous helical cutting edges of the character referred to of any desired length; and also to provide means for detachably connecting the body sections together with their blades associated as above described. These and other objects of the invention will be in part obvious and in part more fully explained in the following description.

The invention consists in the novel parts, improvements, and combinations herein shown and described.

In the accompanying drawings is illustrated one embodiment of the invention with certain modifications of some of the features thereof, the same serving in connection with the description herein to explain the principles of the invention.

Of the drawings; Figure 1 is a side elevation of a composite cutter constructed in accordance with the invention; Fig. 2 is an end elevation of the same with a part broken away to illustrate one of the details; Fig. 3 is a fragmentary plan view illustrating a modification of the blade arrangement; Fig. 3ᵃ is a similar view illustrating one of the elements of the construction indicated in Fig. 3; Fig. 4 is a similar view illustrating in connection with Fig. 2 another modification; Figs. 5 and 6 are, respectively, an end and side view of a modified form of blade; and Figs. 7, 8, and 9 are perspective views illustrating one way of securing together a series of body sections to form a unitary cutter.

In accordance with one feature of the invention, the body portion of the cutter is provided with a series of grooves of helical form accurately cut or machined therein and a series of blades accurately machined to a corresponding helical form fitting said grooves and means for removably clamping the blades in the grooves.

Where a cutter of considerable length is required, it will be found difficult to machine the blades accurately to correspond with the form of the grooves. In accordance with one feature of my invention, I overcome this difficulty by making the blades in sections. Each of a series of short sections can be made so nearly the form of the groove that they will fit the same accurately for all practical purposes, and the cutting edges formed by these sectional blades can be made substantially continuous and accurately ground to provide the proper clearance to bring the cutting edges of each of a series of blades all precisely the same distance from the axis. While these blade sections may be fastened in the grooves in any suitable manner, in accordance with one feature of the invention they are independently fastened in the grooves, and to facilitate this, the body portions of long cutters are preferably made up of sections which correspond in number with the blade sections in each of the several helical cutting edges. In carrying out this feature of the invention, a plurality of such body sections are provided, certain of the blades of one body section projecting beyond an end thereof and being adapted to enter corresponding grooves of an adjacent body section in alinement with blades in said corresponding grooves, whereby the blades of the associated body sections form a plurality of substantially continuous helical cutting edges extending from one end of the composite cutter to the other end thereof.

In Figs. 1 and 2 of the drawings a cutter of the latter description is illustrated. As shown, this cutter comprises three body sections marked 1, 2, and 3, but it will be understood that each of these sections may be used as an independent cutter of the character first described and that other sections may be added, if desired, to form a composite cutter of any desired length. As indicated in the drawing, each of the body sections is provided with a series of grooves accurately machined in the form of a helix of uniform diameter, and accurately fitting each groove is a blade or blade section accurately machined in the form of a helix of uniform diameter, and accurately fitting each groove is a blade or blade section accurately machined to a corresponding helical form.

Any suitable means may be provided for clamping the blade sections in their respective grooves. As shown, the body sections are provided with diagonal grooves between the alternate pairs of helical grooves and the sides of these diagonal grooves are provided with tapering recesses together forming conical openings adapted to receive tapering pins 4 which, on being driven into these openings, will operate to slightly spring the metal between the helical grooves and thus clamp the cutter blades firmly in position.

The grooves in the several body sections are uniformly spaced so that when the sections are assembled on a shaft or mandrel with the grooves in alinement the blades will be joined to form a plurality of substantially continuous cutting edges of helical form the surfaces of which bear a constant angular relation to the axis of rotation and this relation may be varied to give the best cutting efficiency, having regard to the character of the material to be milled and the kind of cuts to be made. The form and arrangement of the blades may also be varied to the same end. In all forms of composite cutters, however, the blades should be so formed and arranged that the joints between the blades of the adjacent sections will not all lie in the same transverse plane. In other words, the joints between the blade sections of the successive composite cutting edges should be broken or staggered with relation to each other. This may be accomplished by various specific forms and arrangements of the blades. Generally speaking, it is accomplished by having the ends of certain blades of one body section project beyond the corresponding end face of the body section into the grooves of an adjacent body section and join with the ends of the blades in such grooves, these joints being in transverse planes different from the planes containing the joints between adjacent ends of the blades. In other words, certain of the blade ends will project beyond the adjacent end faces of the body sections and certain blade ends will terminate within the corresponding end faces of the body sections to provide unoccupied groove ends in certain body sections for the reception of the projecting blade ends on adjacent body sections, the blade arrangement at the adjacent ends of the body sections preferably being complementary one of the other so that the blade sections will be joined to form substantially continuous helical cutting edges of any desired length, the joints of one cutting edge being out of circumferential alinement with the joints of another cutting edge. By reason of this arrangement also the body sections will be joined and interlocked to form a substantially continuous body portion of any desired length.

The body portion, whether single or composite, may be of the same length as the blades, as when the cutter is to be used only for surfacing or "slabbing" purposes; or, if an end milling or channeling cutter is desired, some or all of the blades may be projected beyond one or both end faces of the body portion whether single or complete.

In the embodiment illustrated, the blades at the adjacent ends of the several body sections are alternately projected beyond and terminated within the end faces of the corresponding body sections to form a series of continuous cutting edges having staggered joints and to interlock the body sections, and the blades are projected beyond the opposite or outer end faces of the composite body portion to produce a cutter adapted for both facing and channeling purposes.

In the form illustrated in Figs. 1 and 2, the end body sections 1 and 3 of the composite cutter are each provided with two characters of blades, those of section 1 being marked respectively, 1$^a$ and 1$^b$. The blade sections 1$^a$ and 3$^a$ respectively, are projected at their opposite ends beyond both of the end faces of the corresponding body sections, while the blade sections 1$^b$ and 3$^b$ are respectively projected beyond the outer end faces of the corresponding body sections, but are terminated at their other ends within the inner end faces of the body sections. The ends of these several blades which project beyond the outer ends of the respective body sections 1 and 3 are so formed as to constitute cutting edges adapted to operate in transverse planes as required for end milling or channeling purposes.

The blade sections 2$^c$ and 2$^d$ of the intermediate body section 2 are duplicates of each other, but these blades are staggered, one set 2$^c$ projecting beyond the left hand end face of the body portion and terminating within the right hand end face, while the other set 2$^d$ terminates within the left hand end face and projects beyond the right hand end face. In this way, the blade arrangements at the adjacent ends of the several body sections are made complementary one of the other, each projecting blade end having a groove end of the adjacent body section in which to enter and the blade sections being joined end to end to form substantially continuous helical cutting edges having their joints staggered with relation to each other so that no marks due to these joints will be formed on the surfaces produced by the composite cutter when in operation.

Obviously, any desired number of intermediate cutter sections, exact duplicates of the section 2, may be introduced between the end sections 1 and 3 to produce a channeling cutter of the required length, or any desired number of duplicate cutter sections like or similar to the section 2 may be assembled independently of the end sections to produce a slabbing cutter of the required length.

Various other arrangements of blade sections may obviously be adapted to accomplish substantially the same results as the arrangement indicated in Fig. 1. For instance, in Fig. 3 a blade arrangement is shown wherein each of two or more duplicate body sections 10 may be provided with a series of duplicate blades 10$^a$ arranged in the same way, these body sections being assembled as shown, to form a composite cutter which may be employed either as a slabbing cutter or as both a slabbing cutter and a channeling cutter. In this case, each of the blades 10$^a$ is so formed that it is adapted to cut along its longitudinal edge and at each end, and the blades of each body section are staggered with relation to each other, one projecting at one end a certain distance beyond one end face of the section and terminating at the other end a corresponding distance within the opposite face of the section. By reason of the staggered arrangement, the alternate blades form cutting edges at one end of the body section, and the intermediate blades form cutting edges at the opposite end face of the section. At the same time the alined blades of the adjacent body sections are joined to form substantially continuous helical cutting edges the joints of which are staggered as in the previous form.

It will be obvious that each of these cutter sections is adapted for use independently as a unitary channeling or facing cutter or as an end mill, as indicated in Fig. 3$^a$.

In Figs. 2, 4, 5 and 6 is illustrated a means for preventing accidental endwise movement of the blades in their grooves. As shown, this means comprises a pin or key 11 seated in an opening provided in the bottom of the groove, the pin or key being adapted to enter a recess 12 formed at the proper point in the bottom of the cutter blade 13.

It will be understood that, when in use, the cutter will be mounted upon a suitable shaft, such as a mandrel or the spindle of a milling machine and that they may be secured on the shaft by a simple clamping pressure applied endwise, as by a nut threaded on the shaft. It is sometimes desirable, however, to positively secure the cutters to the shaft. This may be accomplished in various ways. In the case of unitary cutters or cutters having unitary body portions, the latter may be keyed directly to the shaft. In the case of a composite cutter, each section may be keyed to the shaft by a single key or by separate keys engaging a single keyway, where the length of each section equals the pitch of the helical cutting edges or where the lengths of the several sections form equal fractional parts of the pitch, and the number of these parts equals the number of cutting edges or will divide the number of cutting edges without a remainder. Irrespective of the lengths of the body portions, the composite cutters may be positively secured to the shaft by keying one or more of the sections to the shaft and clamping the other sections to the keyed ones. Where the sections are interlocked by projecting blade ends, such sections may be secured by a simple clamping pressure applied endwise, as by a nut at the end of the shaft.

To facilitate grinding the composite cutter, when not mounted on its mandrel, means are preferably provided for securing the sections together independently of the mandrel. This may be done in various ways, as by passing screws through the body sections, the latter being drilled while in proper assembled relation upon the mandrel. In order that several cutter sections may be secured together interchangeably the following arrangement of clamping the screws may be adopted, this arrangement constituting one feature of the invention. According to this feature, certain of the body sections have counter-sunk holes adapted to receive headed screws and certain of the body sections have tapped holes adapted to receive the screws, the tapped holes and the plane ends of the counter-sunk holes bearing the same relation to the blade arrangement, whereby, when body sections are secured together by the screws, the blades will be in helical alinement. As shown, the end section 15 is provided with a pair of counter-sunk holes 16 adapted to receive headed screws 17. The adjacent section 20 is provided with tapped holes 21 bearing the same relation to the blade arrangement as the rear or plane ends of the counter-sunk holes 16 bear to the blade arrangement at the corresponding end of the section 15 so that, when these two sections are secured together by the screws 17 passing through the holes 16 and entering the holes 21, the sections 15 and 20 will be secured together with their blades in helical alinement. The two sections 20 and 25 may be secured together in the same manner by screws 22 passing through counter-sunk holes 23 in the former and entering tapped holes 26 in the latter. It will be seen furthermore, that if the counter-sunk holes 23 in the section 20 bear the same relation to the blade arrangement of that section that the counter-sunk holes 16 bear to the blade arrangement of the section 15, the tapped holes 26 of the section 25 will bear the same relation to the blade arrangement of the section 25 that the tapped holes 21 of the section 20 bear to the latter section, so that the section 25 may be secured directly to the section 15 by the screws 17, and the section 20 omitted. It will also be seen that, by providing a plurality of duplicate sections like the section 20 any desired number of them may be secured together and to the end sections 15 and 25 to form a composite cutter of any desired length. It will be seen furthermore that where the length of each section equals the pitch of the helical cutting edges or where the lengths of the several sections equal fractional parts of the pitch and the number of these parts equals the number of cutting edges or will divide the number of cutting edges without a remainder, the sections may be brought together with the countersunk holes in alinement so that long screws may be passed directly through these holes, the last section having its tapped holes in alinement with these alined countersunk holes to receive the threaded ends of the screws, the whole series of the cutters being secured together by one or more screws.

The invention in its broader aspects, is not limited to the precise construction shown, as many changes may be made in the details of the construction and arrangements of the different features other than those herein disclosed or suggested, without departing from the main principles of the invention and without sacrificing the chief advantages thereof.

What I claim is:

1. A composite milling cutter comprising a body having a plurality of helical grooves therein, and in each groove a plurality of blades of corresponding helical form, said blades being so arranged that the successive joints are relatively staggered, and means for removably clamping the blades in the grooves.

2. A composite milling cutter comprising a plurality of body-portions each having helical grooves therein of the same pitch, and a blade of corresponding helical form fitted to each of said grooves, certain of the blades of one body portion having their ends projecting beyond an end face thereof and adapted to enter corresponding grooves of an adjacent body portion.

3. A composite milling cutter comprising a plurality of body-portions each having helical grooves therein of the same pitch, a blade of corresponding helical form fitted to each of said grooves, certain of the blades of one body portion having their ends projecting beyond an end face thereof and adapted to enter corresponding grooves of an adjacent body portion, and means for removably clamping the blades in the grooves.

4. A composite milling cutter comprising a plurality of body portions, each having a plurality of helical grooves therein of the same pitch and a plurality of blades of corresponding form fitting said grooves, the body portions being assembled with their blades in alinement to form continuous helical cutting edges and certain of the blades projecting into the grooves of adjacent body portions and forming joints with adjacent blades which joints are in planes different from those containing joints of other of the cutting edges.

5. A composite milling cutter comprising a plurality of body portions, each having a plurality of helical grooves therein of the same pitch and a plurality of blades of corresponding form fitting said grooves, certain of the body portions having some blades terminating within the opposite end face and the blade arrangement at adjacent ends of the body portions being complementary one of the other, whereby the blades of the associated body portions form a plurality of substantially continuous helical cutting edges having broken or staggered joints.

6. A composite milling cutter comprising a plurality of body portions, each having blade grooves registering with the blade grooves in the adjacent body portion, and a plurality of blades in said grooves, one or more or such blades engaging in a plurality of body portions.

7. A composite milling cutter comprising a plurality of body portions each having helical grooves therein, a blade of corresponding helical form fitted to each of said grooves, certain of the blades of an end body portion having their outer ends projecting beyond the outer end face of the body portion and constructed to form cutting edges and means for holding the body portions in their assembled relation with their blades in alinement to form substantially continuous helical cutting edges.

8. A composite milling cutter comprising a plurality of body portions, each having helical grooves therein, certain of the body portions having counter-sunk holes and certain of the body portions having tapped holes, the tapped holes and the plain ends of the counter-sunk holes bearing the same relation to the blade arrangements at the corresponding ends of the respective body portions, and headed screws adapted to pass through the counter-sunk holes and enter the tapped holes, whereby the body portions may be secured together with their grooves in helical alinement.

9. A composite milling cutter comprising a plurality of body portions, each having blade grooves registering with the blade grooves in the adjacent body portion, and a plurality of blades in each of said grooves, one or more of such blades engaging in a plurality of body portions so as to break joints with said body portions.

10. A composite milling cutter comprising a plurality of concentric bodies provided with registering helical grooves and with blades in the grooves, each blade occupying grooves in more than one body.

11. A composite milling cutter comprising a plurality of concentric bodies secured together, the bodies having registering helical grooves and blades secured in the grooves, each blade occupying grooves in more than one body.

In testimony whereof, I have signed my name to this specification, in the presence of two subscribing witnesses.

FRIEDERICH MÜLLER.

Witnesses:
R. R. MURPHY,
WM. J. DOLAN.